(12) United States Patent
Kawazu

(10) Patent No.: US 7,800,647 B2
(45) Date of Patent: Sep. 21, 2010

(54) IMAGE CAPTURING DEVICE

(75) Inventor: Keiichi Kawazu, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 675 days.

(21) Appl. No.: 11/629,693

(22) PCT Filed: Jun. 9, 2005

(86) PCT No.: PCT/JP2005/010550

§ 371 (c)(1),
(2), (4) Date: Dec. 14, 2006

(87) PCT Pub. No.: WO2005/125182

PCT Pub. Date: Dec. 29, 2005

(65) Prior Publication Data

US 2008/0012979 A1    Jan. 17, 2008

(30) Foreign Application Priority Data

Jun. 18, 2004   (JP)   ............................. 2004-180961

(51) Int. Cl.
H04N 5/225 (2006.01)

(52) U.S. Cl. ............... 348/207.1; 348/207.11; 348/231.3; 348/207.2; 348/211.1

(58) Field of Classification Search ......... 348/373–376, 348/211.4, 222.1, 207.1, 207.11, 207.2, 207.99, 348/552, 211.1, 231.3; 455/557, 566
See application file for complete search history.

(56) References Cited

U.S. PATENT DOCUMENTS

| 6,429,896 | B1 * | 8/2002 | Aruga et al. | ........... 348/231.99 |
|---|---|---|---|---|
| 6,731,952 | B2 * | 5/2004 | Schaeffer et al. | ............. 455/557 |
| 7,046,924 | B2 * | 5/2006 | Miller et al. | ................... 396/51 |
| 7,228,124 | B2 * | 6/2007 | Koskinen et al. | ......... 455/412.1 |
| 7,388,992 | B2 * | 6/2008 | Atsumi et al. | ............... 382/232 |
| 7,432,952 | B2 * | 10/2008 | Fukuoka | .................. 348/207.1 |
| 7,443,404 | B2 * | 10/2008 | Kawamoto et al. | .......... 345/660 |
| 7,463,734 | B2 * | 12/2008 | Tolbert et al. | .......... 379/433.04 |
| 7,477,796 | B2 * | 1/2009 | Sasaki et al. | ................. 382/248 |
| 2002/0013161 | A1 * | 1/2002 | Schaeffer et al. | ............. 455/557 |
| 2003/0142224 | A1 * | 7/2003 | Fukuda et al. | ............ 348/231.3 |
| 2003/0214670 | A1 * | 11/2003 | Ohmura | ..................... 358/1.15 |
| 2004/0150723 | A1 * | 8/2004 | Seo et al. | .................. 348/207.1 |
| 2004/0204144 | A1 * | 10/2004 | Lim | ........................... 455/566 |
| 2004/0223187 | A1 * | 11/2004 | Imai et al. | ................... 358/1.18 |
| 2005/0146621 | A1 * | 7/2005 | Tanaka et al. | ............. 348/211.2 |

FOREIGN PATENT DOCUMENTS

| JP | 7-135627 A | 5/1995 |
|---|---|---|
| JP | 2003-224750 | 8/2003 |
| JP | 2004-147008 A | 5/2004 |

* cited by examiner

Primary Examiner—Nhan T Tran
Assistant Examiner—Don Nguyen
(74) Attorney, Agent, or Firm—Cohen Pontani Lieberman & Pavane LLP

(57) ABSTRACT

JPEG image data captured by camera module 20 is paired with image capturing information pertaining to image capturing conducted by camera module 20 and a predetermined information area to store image capturing information pertaining to a main body unit, in a form being compliant with Exif standards to output to the main body unit, and the main body unit stores the outputted image data in memory section 16, and further stores image capturing information pertaining to the main body unit for image capturing in the predetermined information are paired with the image data.

8 Claims, 6 Drawing Sheets

IMAGE CAPTURING DEVICE

RELATED APPLICATIONS

This is a U.S. National Phase Application under 35 USC 371 of International Application PCT/JP2005/010550, filed on Jun. 9, 2005.

TECHNICAL FIELD

The present invention relates to an image capturing device which captures an object' image and outputs the captured image data.

BACKGROUND ART

In recent years, image capturing devices, such as digital cameras, have been appreciated as simple image capturing devices, and have become widely among users. The image data captured by these devices is mostly formed to be compliant with the Exif (Exchangeable Image File Format) standards. Because dynamic capturing information, such as exposure times, shutter speeds, luminance, image capturing dates and times, and static capturing information, such as maker's names of the image capturing device, and device's model name, are stored to be later added in the header section of the image data of this standard, the user can review and refer to detailed information during the image capturing occasion. Heretofore, image capturing devices have been proposed which make information added by Exif format to store optional information (see Patent Document 1).

Further, the above-described image capturing devices can be classified broadly into a camera module which captures object's image and outputs the image data, and an image capturing main body unit (hereinafter referred to as "a main body unit") which records and displays the outputted image data. Therefore, the structure has been considered in which Exif information about image capturing is added to the image data captured by the camera module, which are then outputted to the main body unit. Since the camera module can be used as a separate module in this structure, the camera module can generally be applied to the image capturing device, independently to the connected main body unit, which enhances the convenience of availability in the manufacturing process of the image capturing device.

[Patent Document 1] Unexamined Japanese Patent Application Publication 2003-224,750

However, in the above-described image capturing device, structured of the camera module and the main body unit, since there is a possibility that image capturing information may be dispersed to the camera module and the main body unit, a problem may occur in which all information relating to image capturing can not be proposed as Exif information. For example, in a case in which a time counting means to time the image capturing date and hour, exists in the main body unit, since the camera module has not the time counting means, it is not possible for the camera module to add date and time information as Exif information when the captured image data is generated. Further, since the image capturing device described in Patent Document 1 can not be applied to the image capturing device structured of the camera module and the main body, the above problem can not be solved.

The problem of the present invention is to propose an image capturing device which can propose all information for capturing the image, even when such image capturing information is dispersed in the camera module and the main body unit.

DISCLOSURE OF THE INVENTION

In order to solve the above problem, the present invention is attained by the structures described below.

Structure (1) An image capturing device, including:
a camera module; having
an image capturing section; and
a first control section to process image data obtained by the image capturing section; and
a main body unit; having
a second control section to process the image data outputted from the camera module;

and which is characterized in that image capturing information pertaining to image capturing conducted by the image capturing section is transferred between the camera module and the main body unit, enabling processing of the image data.

"Image capturing information" shows image capturing condition and environment when the user inputs instruction of image capturing, for example, generating date and time of the image data, exposure time, F-number, manufacturer's name of the image capturing device, and the device's model name.

Structure (2) In an image capturing device, including:
a camera module having a first control section to process image data obtained by the image capturing section included in the camera module; and
a main body unit having a second control section to store the image data outputted from the camera module to a memory section;
and which is characterized in that the first control section outputs the image data obtained by the image capturing section, and image capturing information pertaining to the camera module which performs the image capturing, to the main body unit; and
the second control section pairs the outputted image data, with both the outputted capturing information pertaining to the camera module and the capturing information pertaining to the main body unit for capturing, in a predetermined format, and stores paired image data and information in the memory section.

Structure (3) In the image capturing device in Structure (2), the predetermined format is compliant with Exif standards.

Structure (4) In an image capturing device, including:
a camera module having a first control section to process image data obtained by the image capturing section included in the camera module; and
a main body unit having a second control section to store the image data outputted from the camera module in a memory section;
and which is characterized in that the second control section outputs image capturing information pertaining to the main body unit to the camera module,
the first control section pairs, using a predetermined format, the image data obtained by the image capturing device, with both the outputted image capturing information pertaining to the main body unit and the image capturing information pertaining to the camera module for image capturing, and the second control section stores the outputted image data in the memory section.

Structure (5) In the image capturing device in Structure (4), the second control section outputs static capturing information of the main body unit, which does not change for image capturing, to the camera module in advance, and also outputs dynamic capturing information pertaining to the main body unit, which changes for image capturing, to the camera module when image capturing is conducted.

In addition, "static capturing information" is information which does not change for image capturing, such as manufacturer's name of the image capturing device, and the device's model name, while "dynamic capturing information" means information which changes for image capturing, such as an image data production date, exposure time and F-number.

Structure (6) In the image capturing device in Structure (4), the predetermined format is compliant with Exif standards.

Structure (7) In an image capturing device, including:
a camera module having a first control means to process image data obtained by the image capturing device included in the camera module; and
a main body unit having a second control section to store the image data outputted from the camera module in a memory section;

and which is characterized in that
the first control section pairs by a predetermined format, the image data obtained by the image capturing device, with both the image capturing information pertaining to the camera module used for image capturing and a predetermined information area for storing image capturing information pertaining to the main body unit, and the first control section also outputs the paired information and information area to the main body unit, and
the second control section stores the outputted image data in the memory section, and further stores image capturing information pertaining to the main body unit for image capturing, in the predetermined information area which is paired with the image data.

Structure (8) In the image capturing device in Structure (7), the predetermined format is compliant with Exif standards.

BRIEF DESCRIPTIONS OF THE DRAWINGS

BEST MODE FOR CARRYING OUT THE INVENTION

The above embodiments will now be detailed, while referring to FIGS. 1-6, in which the image capturing device of the present invention is applied to mobile phone 10 incorporating an image capturing device carrying a camera function.

Figure 1:
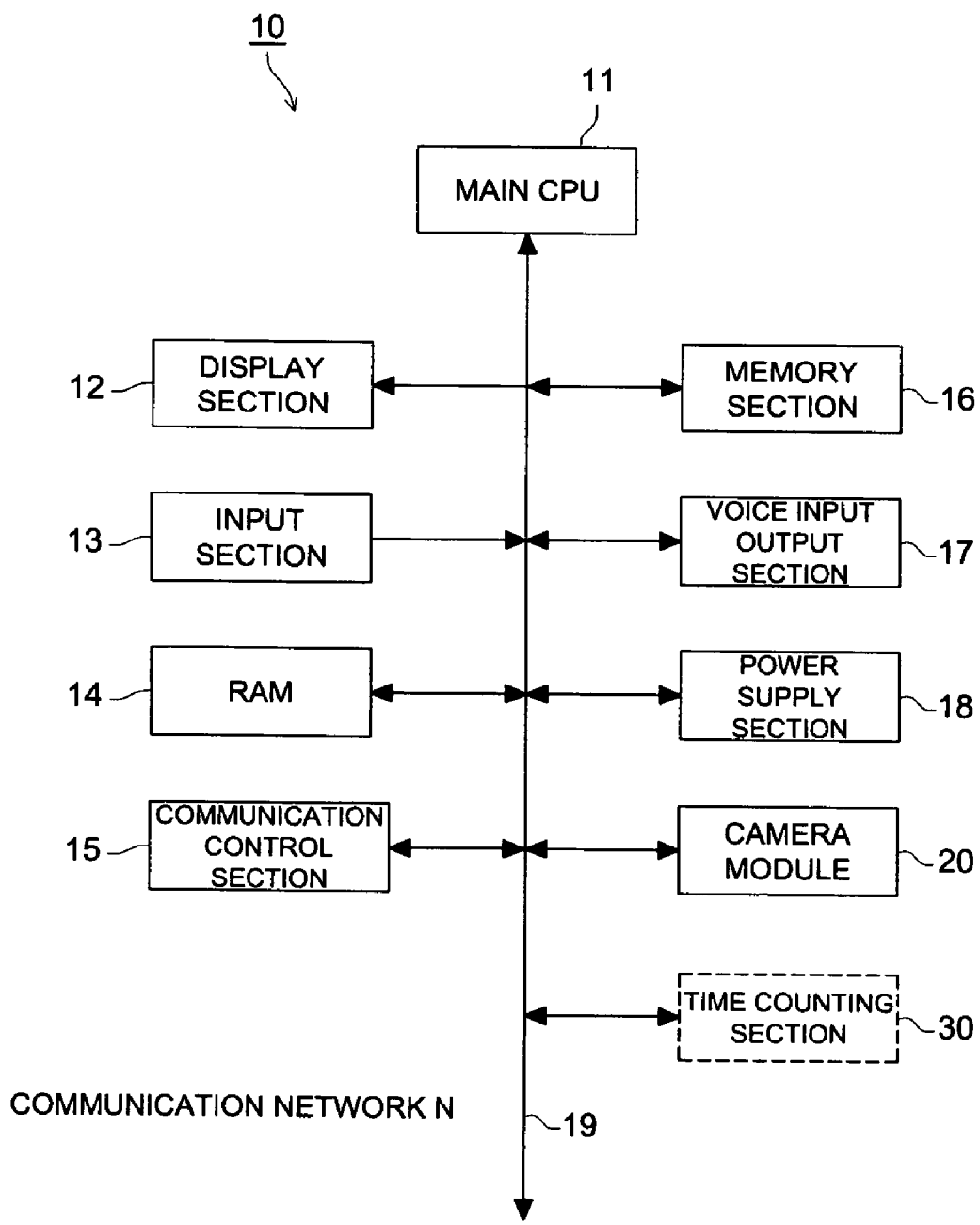
FIG. 1 is a block diagram showing a functional structure of a mobile phone.
Figure 2:
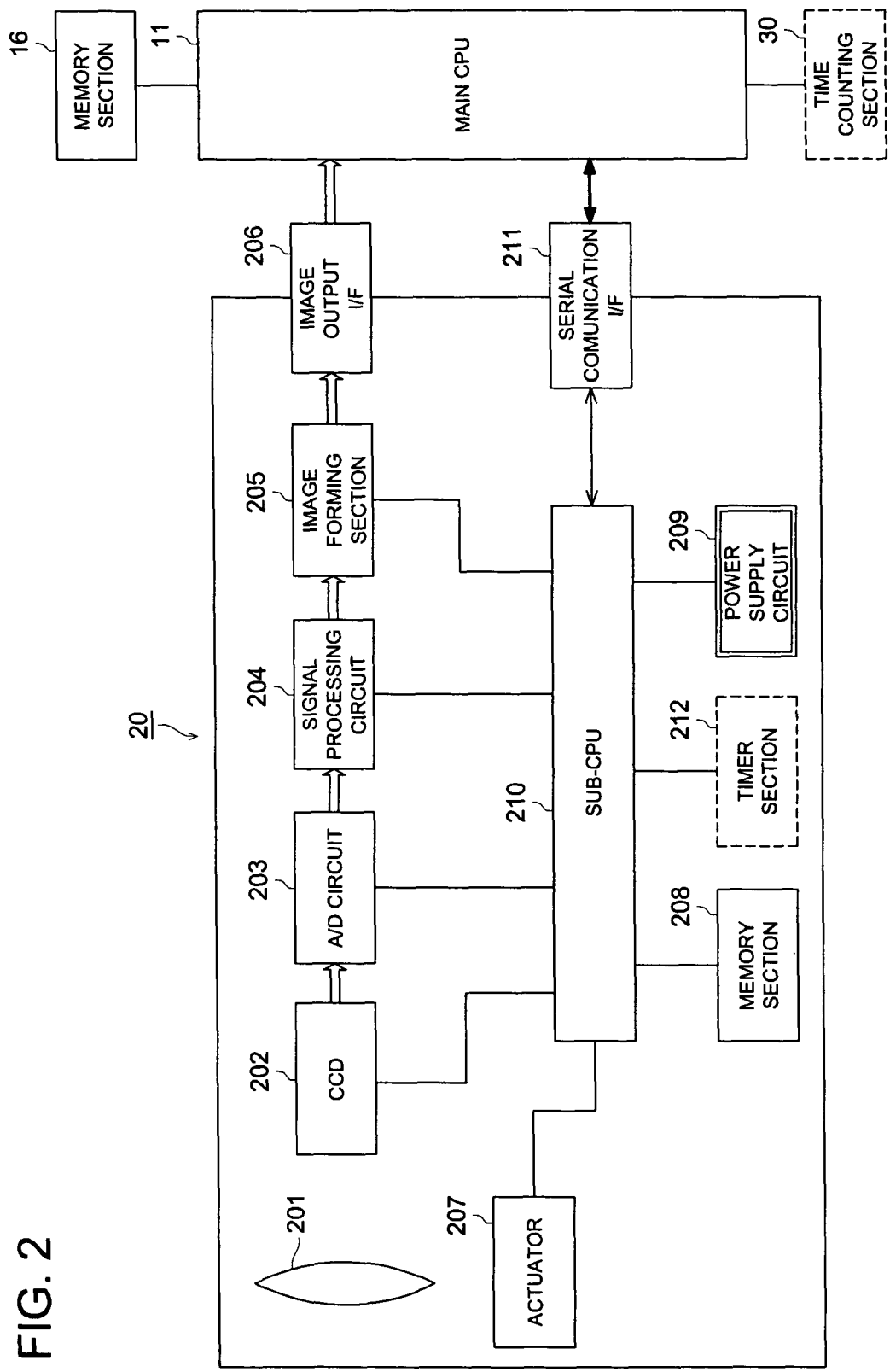
FIG. 2 is a block diagram showing a functional structure of a camera module.

A functional structure of mobile phone 10 is shown in FIG. 1. Mobile phone 10 includes main CPU (Central Processing Unit) 11, display section 12, input section 13, RAM (Random Access Memory) 14, communication control section 15, memory section 16, voice input-output section 17, power supply section 18 and camera module 20, each connected via bus 19. In addition, camera module 20 is the camera module described in the embodiments of the present invention, and mobile phone 10, excluding camera module 20, is the main unit described in the embodiments of the present invention, (hereinafter, the unit in which camera module 20 is excluded from mobile phone 10 is referred to as the main unit).

Main CPU 11 reads out a system program which is stored in memory section 16, and develops the system program onto a work memory which is formed in RAM 14, and thereby main CPU 11 controls each section in accordance with the system program. Further main CPU 11 reads out various processing programs and application programs, such as mailing software, which are stored in memory section 16, and develops them onto the work memory to perform the various processes, and stores processed results in the work memory in RAM 14, and further displays them on display section 12. Yet further, main CPU 11 stores the processed results stored in the work memory in a predetermined section in memory section 16.

Main CPU 11 obtains image capturing information for performing image capturing from each section in the main unit. "Image capturing information" includes image capturing conditions and image capturing circumstances in a case when the user inputs image capturing instruction, such as image capturing date, exposure time, F-number, manufacturer's name of the image capturing device, and the device's model name. In addition, the present embodiment is structured of camera module 20 and the main body unit, in which image capturing information are dispersed. For example, information, such as the exposure time and F-number, exists in camera module 20, while information, such as the image capturing date, the manufacturer's name of the image capturing device and the device's model name exist in the main body unit.

When main CPU 11 receives JPEG image data and image capturing information pertaining to the camera module from camera module 20 while an object's image is captured, main CPU 11 forms Exif image data in which JPEG image data is paired with image capturing information pertaining to the camera module and information of the main body unit, and further, the formed Exif image data is compliant with Exif standards.

When main CPU 11 starts up camera module 20, main CPU 11 outputs image capturing information pertaining to the main body unit to camera module 20. Further, when main CPU 11 starts up camera module 20, main CPU 11 outputs static capturing information for image capturing by camera module 20, and also outputs dynamic capturing information for image capturing, just before camera module 20 starts image capturing.

In addition, "static capturing information" is information which does not change for image capturing, such as manufacturer's name of the image capturing device, and the device's model name, while "dynamic capturing information" means information which changes for image capturing, such as an image data production date, exposure time and F-number.

Main CPU 11 stores Exif image data, which is outputted from camera module 20, in memory section 16, and further, stores image capturing information pertaining to the main body unit in a predetermined information area which was previously paired with the Exif image data.

Yet further, main CPU 11 displays the Exif image data stored in memory section 16 on display section 12.

Display section 12 is structured of an LCD (Liquid Crystal Display) panel, which displays various images based on display data inputted from main CPU 11.

Input section 13 includes a cursor key, character/numeric keys and various function keys, and when these keys are depressed, input section 13 outputs respective signals to main CPU 11.

RAM 14 forms a work area as a buffer to temporarily store the various programs, data under processing and processed results.

Communication control section 15 is structured of wireless communication systems including an antenna, and sends or receives various information between each device, connected by the communication network through wireless stations, based on the instruction inputted from main CPU 11.

Memory section 16 is structured of a non-volatile memory, such as a flash memory, which records the system program for mobile phone 10, the various processing programs to be used in the system programs, the application programs, and the data which are processed by those programs.

Further, memory section 16 stores JPEG image data or Exif image data, outputted from camera module 20.

Voice input-output section 17 is structured of a microphone, a speaker, an amplifier, an A/D converter and a D/A converter, which convert audio signals inputted from a user through the microphone to digital voice signals, and outputs the digital voice signals to main CPU 11, and converts not only voice information received from main CPU 11, but also other sound information, such as incoming melodies and operation recognizing sounds, to analog voice-sound signals and amplifies them to be outputted via the speaker.

Power supply section 18, which is structured of a power supply circuit and a chargeable battery, supplies electrical power to each section of mobile phone 10, based on the instruction inputted from main CPU 11.

Camera module 20 is structured of image capturing optical system 201, CCD 202, A/D circuit 203, signal processing circuit 204, image generating section 205, image output I/F 206, actuator 207, memory section 208, power supply circuit 209, sub-CPU 210 and serial communication I/F 211.

Image capturing optical system, which focuses an optical image of an object, is structured of focusing lenses (which are not illustrated) to produces a clear image of the object.

CCD 202 converts the image of the object, which is concentrated on a light receiving surface by image capturing optical system 201, to electrical signals, and the electrical signals are outputted as analog image data to A/D circuit 203. In the present embodiments, a CCD is employed, but a CMOS (Complementary Metal Oxide Semiconductor) sensor may also be employed.

A/D circuit 203 converts the analog image data outputted from CCD 202 to digital image data, and outputs the digital image data to signal processing circuit 204. Signal processing circuit 204 executes YUV data conversion, gamma compensation and white balance compensation, onto the image data outputted from A/D circuit 203, after which the image data is outputted to image generating section 205.

Image generating section 205 compresses the image data outputted from signal processing circuit 204, through using a compressing method based on JPEG method, and outputs the generated JPEG image data to image output I/F 206. Further, being controlled by sub-CPU 210, image generating section 205 forms Exif image data with which image capturing information is paired by the format based on Exif standards, on a header section of the JPEG image data, and outputs it to image output I/F 206.

Additionally, the image data is formed based on the JPEG method in the present embodiments, but it is not limited to base on the JPEG method, the image data may also, for example, be formed based on TIFF (Tag Image File Format).

Further, image capturing information is paired by the format based on Exif standards in the present embodiments, but may also be paired by the formats based on other standards, and is not limited to Exif.

Image output I/F 206 is an interface section to output the JPEG image data or the Exif image data outputted from image forming section 205, to main CPU 11, and is connected to main CPU 11 via a high speed one-way bus.

Actuator 207 includes a focusing lens motor and a focusing driver, which are not illustrated. The focusing driver activates the focusing lens motor based on control signals inputted from sub-CPU 210, and drives the focusing lenses of image capturing optical system 201 in the optical axial direction.

Memory section 208, structured of a non-volatile memory, such as flash memory, stores program codes and various control parameters which are used to control each section of camera module 20.

Further, memory section 208 stores image capturing information pertaining to the main body unit outputted from main CPU 11, and then image capturing information pertaining to the main body unit, which was stored when Exif image data was generated, is obtained by sub-CPU 210.

Power supply circuit 209 controls the voltage of the electrical power supplied from power supply section 18 shown in FIG. 1, and supplies electrical power to each section of camera module 20 based on the control of sub-CPU 210.

Sub-CPU 210 controls each section of camera module 20 based on the program codes stored in memory section 208, and also controls each section of camera module 20, based on the control signals outputted from main CPU 11 through serial communication I/F 215.

Further, sub-CPU 210 obtains image capturing information from each section of camera module 20, and outputs said image capturing information pertaining to the camera module to CPU 11 via serial communication I/F 211, or pairs said image capturing information pertaining to the camera module onto the header section of JPEG image data generated by image generating section 205, by the format based on Exif standards.

Serial communication I/F 211 is a serial communication interface which connects sub-CPU 210 with main CPU 11. Serial communication I/F 211 outputs the various signals inputted from sub-CPU 210 to main CPU 11, and outputs the control signals inputted from main CPU 11 to sub-CPU 210.

Next, the operations of Embodiments 1-4 will be detailed.

Embodiment 1

Figure 3:
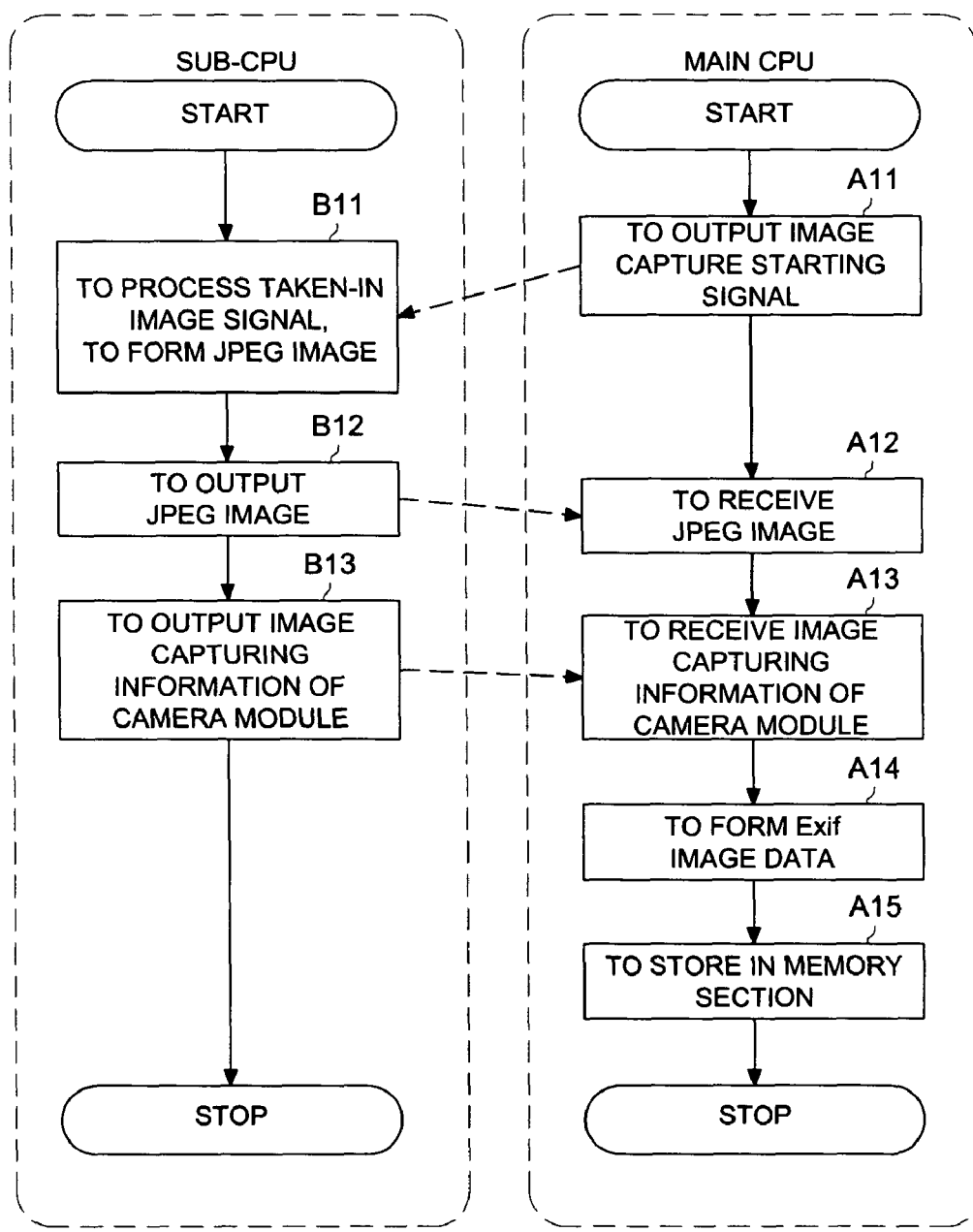
FIG. 3 is a flow chart detailing the image capturing process in Embodiment 1.

The operation of Embodiment 1 will be detailed while referring to FIG. 3. Processes A11-A15 are conducted by main CPU 11, while processes B11-B13 are conducted by sub-CPU 210.

Embodiment 1 shows that both JPEG image data obtained through image capture by camera module 20 and image capturing information pertaining to the camera module relating to the above image capturing are outputted to the main body unit, and further, in the main body unit, outputted JPEG image data is paired with both the image capturing information pertaining to the camera module and the image capturing information pertaining to the main body unit while image capturing, whereby the Exif image data is formed.

Firstly, a signal to instruct the start of image capturing is outputted from main CPU 11 to sub-CPU 211 through serial communication I/F 211 (being step A11).

After sub-CPU 210 receives the above capture starting signal, the image data taken in CCD 202 through image capturing optical system 201 is processed in A/D circuit 203 and signal processing circuit 204, after which the image data is generated as JPEG image data in image forming section 205 (being step B11).

Next, the generated JPEG image data is outputted to main CPU 11 through image output I/F 206 (being step B12), and this image capturing information of camera module 20 for image capturing is outputted to main CPU 11 through serial communication I/F 211 (being step B13), which completes the process of camera module 20. In addition, image capturing information of camera module 20 is outputted through serial communication I/F 211, but it is also possible to output through image output I/F 206.

On the other hand, after the JPEG image and image capturing information pertaining to the camera module are received by the main body unit from the camera module (being steps A12 and A13), image capturing information pertaining to the camera module and image capturing information pertaining to the main body unit are paired on the header section of the JPEG image data, which become the Exif image data (being step A14), and the Exif image data is then stored in memory section 16 (step A15), whereby the process of the main body unit is completed.

As described above, by mobile phone 10 of Embodiment 1, though image capturing information exists not only in camera module 20 but also in the main body unit, camera module 20 outputs image capturing information of camera module 20 and JPEG image data to the main body unit, and in the main body unit, the received JPEG image data is paired with image capturing information pertaining to the camera module and image capturing information pertaining to the main body unit by the format which is compliant with Exif standards, and they are then stored in the memory section. Accordingly, Embodiment 1 can totally process the entire image capturing information.

Embodiment 2

Figure 4:
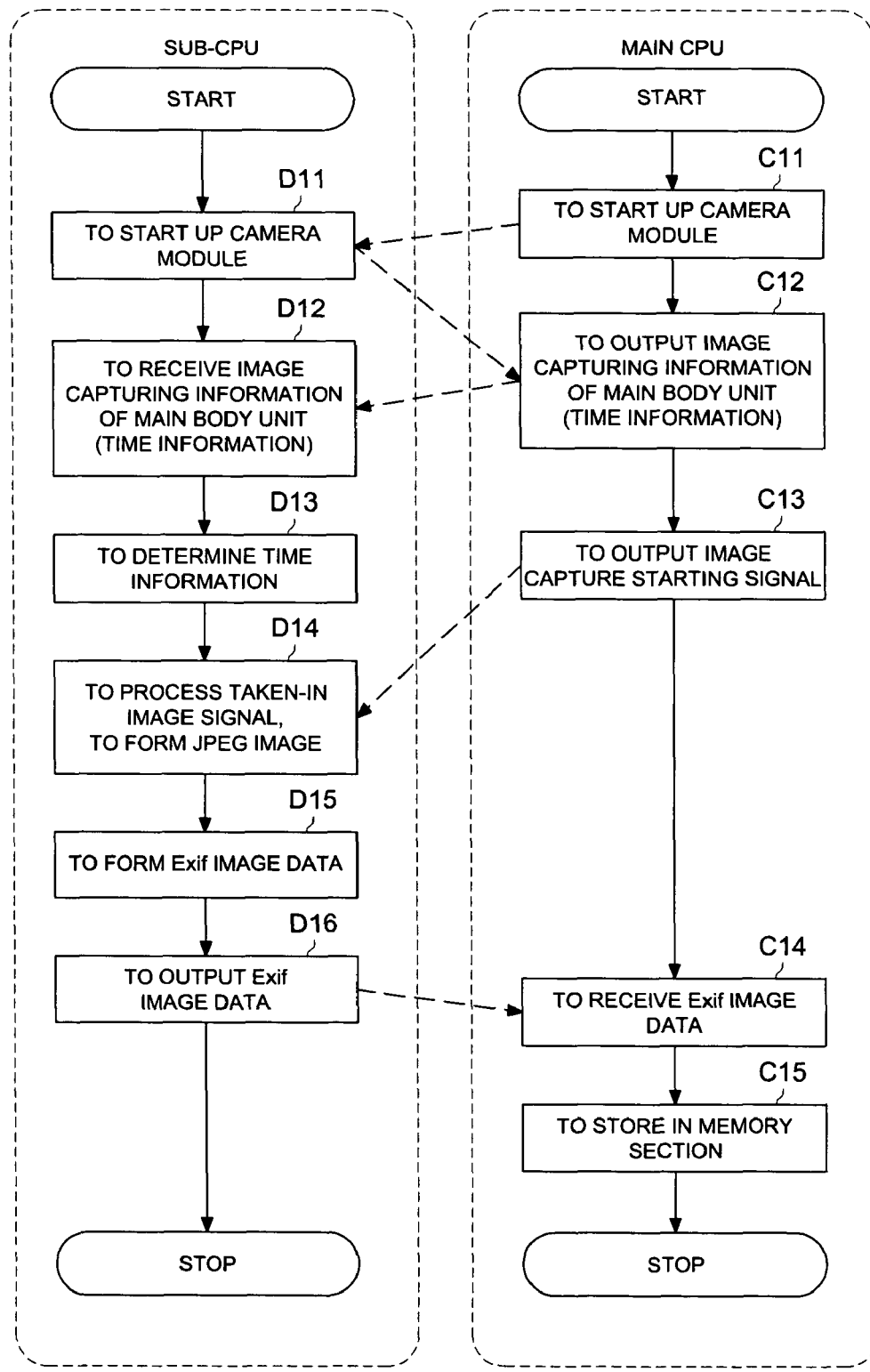
FIG. 4 is a flow chart detailing the image capturing process in Embodiment 2.

The operation of Embodiment 2 will be detailed while referring to FIG. 4. The processes of steps C11-C15 in Embodiment 2 are conducted by main CPU 11, while the processes of steps D11-D16 are conducted by sub-CPU 210. Specifically in Embodiment 2, mobile phone 10 is provided with time counting section 30 for counting the time, illustrated by the dotted frame in FIG. 1, and camera module 20 is provided with timer section 212 for counting the time illustrated by the dotted frame in FIG. 2.

In Embodiment 2, when camera module 20 is turned on, the main body unit outputs image capturing information (which is time information) of the main body unit, and camera module 20 pairs JPEG image data obtained by image capturing with image capturing information pertaining to the camera module and counted values based on time information from the main body unit, and thereby the Exif image data is generated, which is outputted to the main body unit.

Firstly, main CPU 11 outputs a signal to sub-CPU 210 to instruct the startup of camera module 20 through serial communication I/F (being step C11).

After sub-CPU 210 receives the camera module startup signal, sub-CPU 210 causes each section of camera module 20 to start up, after which outputs a signal showing completed startup to main CPU 11 through serial communication I/F 211 (being step D11).

After receiving the completed startup signals, main CPU 11 obtains present time information from time counting section 30, and outputs present time information as image capturing information pertaining to the main body unit to sub-CPU through serial communication I/F 211 (being step C12).

After receiving time information (being step D12), Sub-CPU 210 sets said time information to timer section 212 to conduct time counting based on said time information (being step D13).

Under this condition, main CPU 11 outputs a signal to instruct the start of image capturing to sub-CPU through serial communication I/F 211 (being step C13). Sub-CPU 210 receives the start signal, and processes the image data, taken in CCD 202 through image capturing optical system 201, by A/D circuit 203 and signal processing circuit 204, whereby sub-CPU 210 generates JPEG image data in image generating section 205 (being step D14).

After sub-CPU obtains a time count value from timer section 212, image capturing information of camera module 20 and the above time count value are paired on the header section of the JPEG image data generated in step D14, by the format which is compliant with Exif standards, which becomes the Exif image data (being step D15). Sub-CPU 210 outputs this Exif image data to main CPU 11 through serial communication I/F 211 (being step D16), after which the process of camera module 20 is completed.

Main CPU 11 receives the Exif image data (being step C14), and stores it in memory section 16 (being step C15), after which the process of the main body unit is completed.

As described above, by mobile phone 10 of Embodiment 2, though image capturing information exists not only in camera module 20 but also in the main body unit, the main body unit outputs image capturing information pertaining to the main body unit to camera module 20, and in camera module 20, the outputted image capturing information pertaining to the main body unit and image capturing information are paired with the JPEG image data by the format which is compliant with Exif standards, and the main body unit stores the Exif image data in the memory section. Accordingly Embodiment 2 offers entire image capturing information for image capturing.

Embodiment 3

Figure 5:
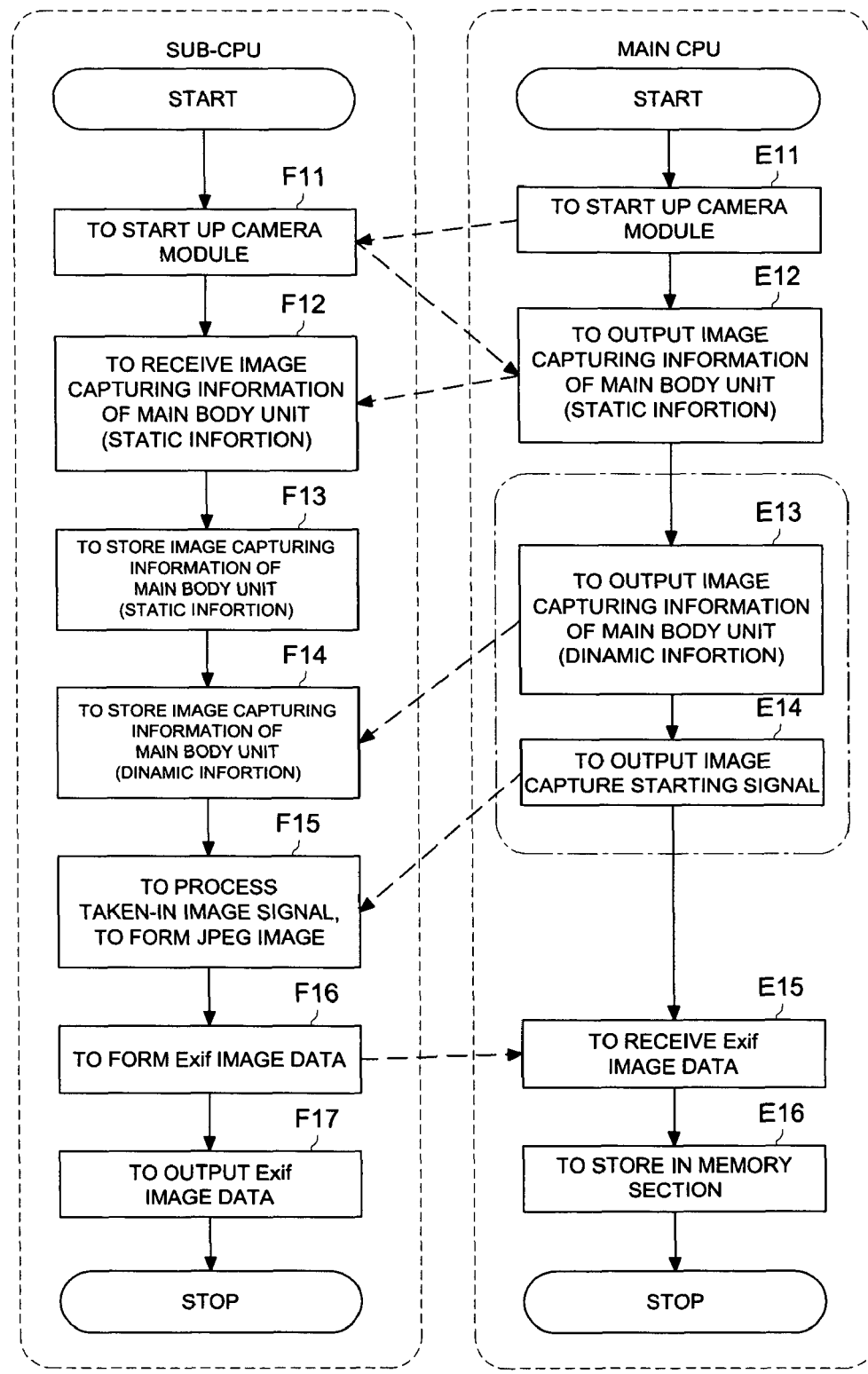
FIG. 5 is a flow chart detailing the image capturing process in Embodiment 3.

The operation of Embodiment 3 will be detailed while referring to FIG. 5. The processes of steps E11-E15 in Embodiment 3 are conducted by main CPU 11, while the processes of steps F11-F16 are conducted by sub-CPU 210. Specifically in Embodiment 3, mobile phone 10 is provided with time counting section 30 for counting the time, illustrated by the dotted frame in FIG. 1.

In Embodiment 3, when camera module 20 is turned on, the main body unit outputs static capturing information pertaining to the main body unit to camera module 20. When image capturing is conducted, the main body unit outputs dynamic capturing information pertaining to the main body unit to camera module 20. In camera module 20, the JPEG image data obtained by image capturing is paired with image capturing information pertaining to the camera module and image capturing information outputted from the main body unit, and thereby Exif image data is generated, which is outputted to the main body unit.

Firstly, main CPU 11 outputs a signal to instruct the startup of camera module 20 to sub-CPU 210 through serial communication I/F (being step E11).

After sub-CPU 210 receives the camera module startup signal, sub-CPU 210 causes each section of camera module 20 to start up, after which it outputs a signal showing completed startup to main CPU 11 through serial communication I/F 211 (being step F11).

After receiving the signals showing completed startup, main CPU 11 outputs static capturing information pertaining to the main body unit, (hereinafter referred to as "static main unit information"), which does not change in image capturing by camera module 20, to sub-CPU through serial communication I/F 211 (being step E12).

After receiving main body static information (being step F12), sub-CPU 210 stores main body static information in memory section 208 (being step F13).

Under this condition, when a user inputs a signal to instruct the start of image capturing through input section 13, main CPU 11 outputs dynamic capturing information pertaining to the main body unit (hereinafter referred to as "dynamic main unit information") to sub-CPU 210 through serial communication I/F 211 (being step E13), and then outputs the capturing starting signal to sub-CPU 210 through serial communication I/F (being step E14). In addition, in Embodiment 3, dynamic main unit information is outputted just before the capturing starting signal. However, the step is not limited to the above, but it is also possible that dynamic main unit information is outputted just after the capturing starting signal has been outputted.

Sub-CPU 210 receives dynamic main unit information, and stores it in memory section 208 (being step F14), and after receiving the capturing starting signal, sub-CPU processes the image data which was taken in CCD 202 through image capturing optical system 201, in A/D circuit 203 and signal processing circuit 204, and the processed image data becomes the JPEG image data in image generating section 205 (being step F15).

After sub-CPU 210 obtains both static main unit information and dynamic main unit information from memory section 208, image capturing information of camera module 20, static main unit information and dynamic main unit information are paired on the header section of the JPEG image data generated in step F14, by the format which is compliant with Exif standards, which then becomes the Exif image data (being step F16). Sub-CPU 210 outputs this Exif image data to main CPU 11 through serial communication I/F 211 (being step F17), then the process of the camera module is completed.

Main CPU 11 receives the Exif image data (being step E15), and stores it in memory section 16 (being step E16), then the process of the main body unit is completed.

As described above, by mobile phone 10 of Embodiment 3, though image capturing information exists not only in camera module 20 but also in the main body unit, the main body unit outputs image capturing information pertaining to the main body unit to camera module 20, and in camera module 20, the outputted image capturing information pertaining to the main body unit and image capturing information of camera module 20 are paired with the JPEG image data by the format which is compliant with the Exif standards, and the main body unit stores the Exif image data in the memory section. Accordingly Embodiment 3 can offer entire image capturing information for image capturing.

Further, in Embodiment 3, static main unit information, which does not change for image capturing, is previously outputted to the camera module, while dynamic main unit information, which changes for image capturing, is outputted to camera module 20, when image capturing is conducted. Accordingly, dynamic main unit information can be outputted to camera module 20 for each image capturing, that is, image capturing information pertaining to the main body unit can be paired with the captured image data.

Embodiment 4

Figure 6:
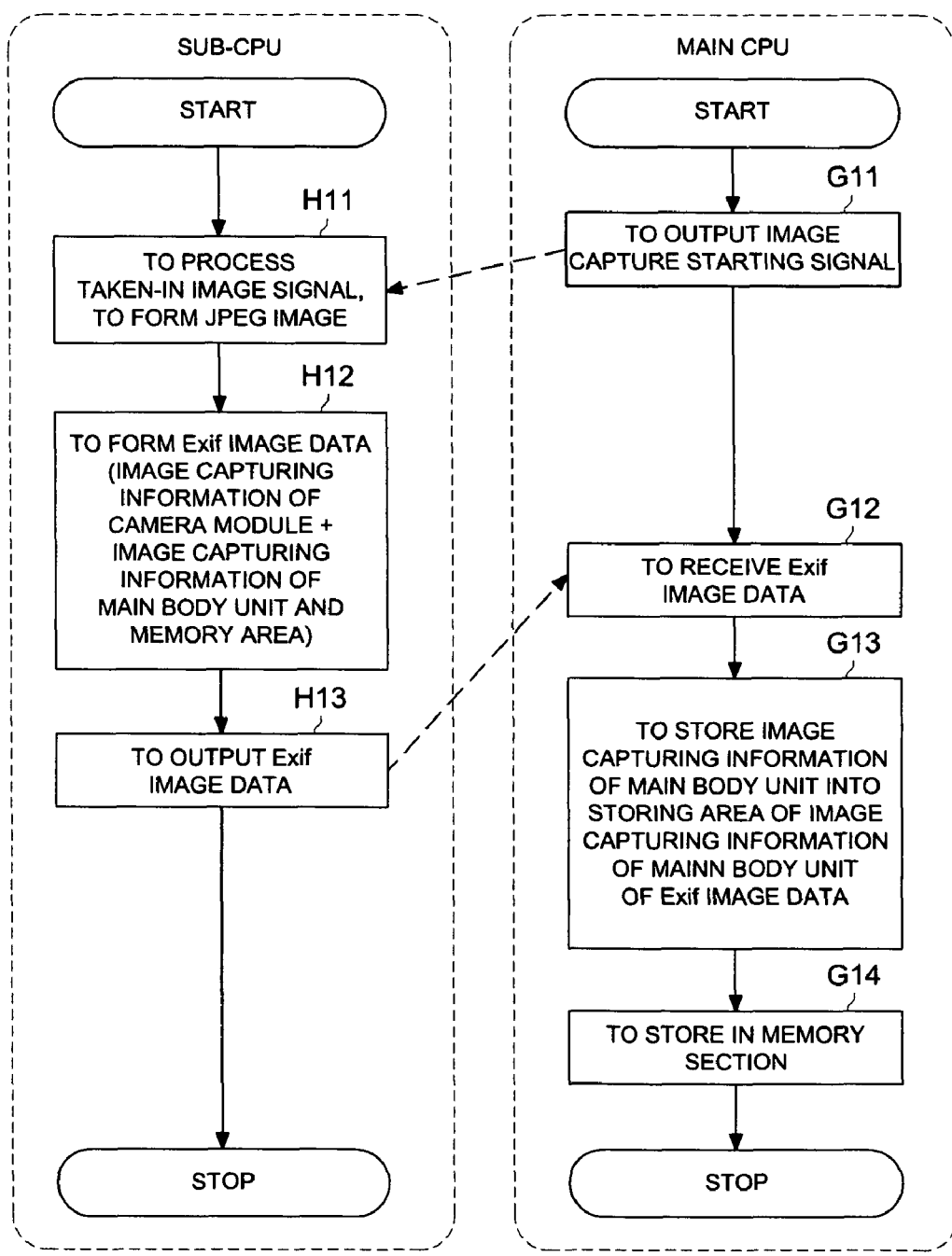
FIG. 6 is a flow chart detailing the image capturing process in Embodiment 4.

The operation of Embodiment 4 will be detailed while referring to FIG. 6. The processes of steps G11-G15 in Embodiment 4 are conducted by main CPU 11, while the processes of steps H11-H16 are conducted by sub-CPU 210.

In Embodiment 4, the JPEG image data obtained through image capturing by camera module 20 is paired with both the image capturing information of camera module 20 relating to the above image capturing and the predetermined information area reserved for storing image capturing information pertaining to the main body unit, in a predetermined format, to be outputted to the main body unit. In the main body unit, the outputted image data is stored in memory section 16, and yet further, image capturing information pertaining to the main body unit relating to the above image capturing is stored in the predetermined information area which is paired with the image data.

Firstly, a signal to instruct the start of image capturing is outputted from main CPU 11 to sub-CPU 211 through serial communication I/F 211 (being step G11).

After sub-CPU 210 receives the above-described capturing starting signal, the image data taken in CCD 202 through image capturing optical system 201 is processed in A/D circuit 203 and signal processing circuit 204, after which the image data is generated as JPEG image data in image forming section 205 (being step H11).

Next, image capturing information of camera module 20 is attached on the header section of the formed JPEG image data, in the format which is compliant with Exif standards, moreover, a predetermined information area is reserved to store image capturing information pertaining to the main body unit, and which become the Exif image data (being step H12). The Exif image data is outputted to main CPU 11 through serial communication IF 211 (being step H13), after which the process in camera module 20 is completed.

At this point, regarding the image format which is compliant with Exif standards, image capturing information corresponding to plural information areas also known as "tags" is stored. Accordingly, if no predetermined area to store the main body unit in Embodiment 4 is reserved, the tag and image capturing information may not be able to interface. Therefore, in step H12, as an example, in order to reserve the information area, dummy data is stored in the information area which is primitively used for storing the image capturing information pertaining to the main body unit.

On the other hand, after receiving the Exif image data (being step G12), main CPU 11 stores the Exif data in memory section 16, and further stores image capturing information of the main body, relating to the image capturing, in the predetermined information area which is paired with the Exif image data (being steps G13 and G14), after which the process of the main body unit is completed.

As described above, by mobile phone 10 of Embodiment 4, though image capturing information exists not only in camera module 20 but also in the main body unit, both the image capturing information of camera module 20 and the predetermined information area reserved for storing image capturing information pertaining to the main body unit are paired in the format which is compliant with Exif standards. Further in the main body unit, image capturing information pertaining to the main body unit can be stored in the above-cited predetermined information area. Accordingly, Embodiment 4 can offer entire image capturing information for image capturing.

The above-described Embodiments show examples of the image capturing device relating to the present invention, and the invention is not limited to these Embodiments. In addition, the detailed structure and operation of mobile phone 10 in the present embodiments is changeable within the scope of the present invention.

For example, as a device featuring the image capturing device of the present invention, mobile phone 10 with the image capturing device having the camera function is used for the explanations, but a PDA (Personal Digital Assistant) may also be used which has a digital camera or a camera function.

Industrial availability of the present invention will now be detailed.

Based on Structure 1 of the present invention, this invention is structured in such a way that image capturing information of the image capturing means, relating to image capturing, is transferred between the camera module and the main body unit, to process the image data. Due to this, though image capturing information exists not only in the camera module but also in the main body unit, the present invention can offer entire image capturing information relating to image formation.

Based on Structure 2 of the present invention, the first control section outputs the image data obtained by the image capturing device, and image capturing information pertaining to the camera module for performing the image capturing, to the main body unit, and the second control section pairs the outputted image data with both the image capturing information pertaining to the camera module and the image capturing information pertaining to the main body unit for image capturing, by a predetermined format, and stores the paired information in the memory section. Due to this, though image capturing information exists not only in the camera module but also in the main body unit, the camera module outputs the image data with image capturing information pertaining to the camera module to the main body unit. Further, both the image capturing information pertaining to the camera module and the image capturing information pertaining to the main body unit are attached to the above image data in the predetermined format to be stored. Therefore, the present invention can offer entire image capturing information relating to image capturing.

Based on Structure 3 of the present invention, the predetermined format is one which is compliant with Exif standards. Due to this, with the captured image data being compliant with Exif standards, most image browsing software can be used, and the obtained image data can be more generally used.

Based on Structure 4 of the present invention, the second control section outputs image capturing information pertaining to the main body unit to the camera module unit, while the first control section pairs the image data obtained by the image capturing device, with both the outputted image capturing information pertaining to the main body unit, and image capturing information pertaining to the camera module for image capturing, and outputs them to the main body unit, and further the second control section stores the outputted image data in the memory section. Due to this, though image capturing information exists in not only the camera module but also in the main body unit, the main body unit outputs image capturing information pertaining to the main body unit to the camera module. Further, both the image capturing information pertaining to the main body unit and the image capturing information pertaining to the camera module are attached to the image data in the predetermined format in the camera module, and the image data is stored in the main body unit. Therefore, the present invention can offer entire image capturing information relating to image capturing.

Based on Structure 5 of the present invention, the second control section outputs static capturing information, which does not change for image capturing, of the main body unit, to the camera module in advance, and also outputs dynamic capturing information, which changes for image capturing, of the main body unit, to the camera module when image capturing is conducted. Due to this, dynamic capturing information pertaining to the main body unit can be outputted to camera module 20 for each image capturing, that is, image capturing information pertaining to the main body unit can be paired with the image data.

Based on Structure 6 of the present invention, the predetermined format is one which is compliant with Exif standards. Due to this, the captured image data is compliant with Exif standards so that most image browsing software can be used, and the obtained image data can be more generally used.

Based on Structure 7 of the present invention, the first control section pairs the image data obtained by the image capturing device, and both image capturing information pertaining to the camera module for image capturing, and a predetermined information area for storing image capturing information pertaining to the main body unit, in a predetermined format, and further the first control section outputs the paired information to the main body unit. The second control section stores the outputted image data in the memory section, and further stores image capturing information pertaining to the main body unit for image capturing in the predetermined information area which is paired with the image data. Due to this, though image capturing information exists in not only the camera module but also in the main body unit, both the image capturing information pertaining to the camera module and the predetermined information area reserved for storing image capturing information pertaining to the main body unit are paired in the predetermined format. Further in the main body unit, image capturing information pertaining to the main body unit can be stored in the above-described predetermined information area. Therefore, the present invention can offer entire image capturing information relating to image capturing.

Based on Structure 7 of the present invention, the predetermined format is one which is compliant with Exif standards. Due to this, since the captured image data is compliant with Exif standards, most image browsing software can be used, and the obtained image data can be more generally used.

What is claimed is:

1. An image capturing device, comprising:
   a camera module and a main body unit, the camera module having:
      an image capturing section to capture an image,
      a first control section to process image data obtained by the image capturing section, and
      a first memory section to store program codes and control parameters of the camera module, and to store information from the main body unit through the first control section, wherein the camera module outputs the image data into the main body unit; and
   the main body unit having:
      a second memory section to store the image data outputted from the camera module, and
      a second control section to control the second memory section to store the image data outputted from the camera module,
   wherein the first control section outputs the image data obtained by the image capturing section and first image capturing information pertaining to the camera module into the main body unit, and wherein the second control section pairs, using a predetermined format, the image data outputted from the first control section with both the first image capturing information outputted by the first control section and second image capturing information pertaining to the main body unit to capture the image, wherein the second control section controls the second memory section to store the image data and the first and second image capturing information, each of which has been paired, and wherein the second control section controls the first control section to store the second image capturing information pertaining to the main body unit in the first memory section of the camera module.

2. The image capturing device of claim 1, wherein the predetermined format is compliant with Exif standards.

3. The image capturing device of claim 1, wherein the image capturing information includes date and time of the image data, exposure time, F-number, manufacturer's name of the image capturing device, and model name of the device.

4. An image capturing device, comprising:
a camera module and a main body unit, the camera module having:
an image capturing section to capture an image,
a first control section to process image data obtained by the image capturing section, and
a first memory section to store program codes and control parameters of the camera module, and to store information outputted from the main body unit through the first control section, wherein the camera module outputs the image data into the main body unit; and
the main body unit having:
a second memory section to store the image data outputted from the camera module, and
a second control section to control the second memory section to store the image data outputted from the camera module,
wherein the second control section outputs second image capturing information pertaining to the main body unit into the camera module, and
wherein the first control section pairs, using a predetermined format, the image data obtained by the image capturing section with both the second image capturing information pertaining to the main body unit and first image capturing information pertaining to the camera module to capture the image,
wherein the second control section controls the second memory section to store the image data and the first and second image capturing information, each of which has been paired, and wherein the second control section controls the first control section to store the second image capturing information pertaining to the main body unit into the first memory section of the camera module.

5. The image capturing device of claim 4, wherein the second control section outputs static capturing information of the second capturing information, which is static and does not change during an image capturing operation, into the camera module before the image capturing operation is conducted, and outputs dynamic capturing information of the second image capturing information, which is dynamic and changes during the image capturing operation, into the camera module when the image capturing operation is being conducted.

6. The image capturing device of claim 4, wherein the predetermined format is compliant with Exif standards.

7. An image capturing device, comprising:
a camera module and a main body unit, the camera module having:
an image capturing section to capture an image,
a first control section to process image data obtained by the image capturing section, and
a first memory section to store program codes and control parameters of the camera module, and to store information from the main body unit through the first control section, wherein the camera module outputs the image data into the main body unit; and
the main body unit having:
a second memory section to store the image data outputted from the camera module, and
a second control section to control the second memory section to store the image data outputted from the camera module,
wherein the first control section pairs, using a predetermined format, the image data processed by the first control section with a predetermined information area for storing first image capturing information pertaining to the camera module and second image capturing information pertaining to the main body unit to capture the image,
wherein the first control section outputs the image data and the predetermined information area, each of which has been paired, to the main body unit, and
wherein the second control section controls the first memory section to store the outputted image data, and store the second image capturing information in the predetermined information area which is paired with the image data.

8. The image capturing device of claim 7, wherein the predetermined format is compliant with Exif standards.

* * * * *